United States Patent [19]
Knöss et al.

[11] Patent Number: 5,529,746
[45] Date of Patent: Jun. 25, 1996

[54] PROCESS FOR THE MANUFACTURE OF HIGH-DENSITY POWDER COMPACTS

[76] Inventors: Walter Knöss, Edelweissstrasse 24, D-87629 Füssen-Weissensee; Manfred Schlemmer, Grashofstrasse 83, 45133 Essen, both of Germany

[21] Appl. No.: 401,092

[22] Filed: Mar. 8, 1995

[51] Int. Cl.$^6$ ............................................. B22F 3/16
[52] U.S. Cl. ................... 419/52; 419/38; 419/39; 419/48; 419/51
[58] Field of Search ................... 419/38, 39, 48, 419/51, 52; 75/226, 244; 364/477; 204/130; 148/101, 104

[56] References Cited

U.S. PATENT DOCUMENTS

| | | | |
|---|---|---|---|
| 3,567,903 | 3/1971 | Parker | 219/149 |
| 4,102,679 | 7/1978 | Arvela | 75/226 |
| 4,929,415 | 5/1990 | Okazaki | 419/52 |
| 4,989,153 | 1/1991 | Bonvini | 364/477 |
| 5,178,691 | 1/1993 | Yamashita et al. | 148/101 |
| 5,201,962 | 4/1993 | Yamashita et al. | 148/101 |
| 5,427,660 | 6/1995 | Kamimura et al. | 204/130 |

FOREIGN PATENT DOCUMENTS 2045041  8/1970  Germany.

*Primary Examiner*—Donald P. Walsh
*Assistant Examiner*—John N. Greaves
*Attorney, Agent, or Firm*—Morgan & Finnegan

[57] ABSTRACT

The invention relates to a process for pressing electrically conductive powders to high-density compacts in dimensionally stable pressing molds, whereby the achievable compression density is greater than 96% and, in many cases, amounts to almost 100% of the theoretical density of suitable materials. For said purpose, static pressing of the powders according to conventional methods is superimposed by a second process step, in which from 1 to 3 electric current pulses of from $5 \times 10^{-5}$ to $5 \times 10^{-2}$ s duration and high electric power are applied to the punches of the press. As opposed to known methods, no notable sintering of powder of particles occurs in such process. The process is especially suitable for the manufacture of high-density and high-strength, sintered mass-produced components, where compacts are produced on automatic presses with high cycle frequencies.

11 Claims, No Drawings

PROCESS FOR THE MANUFACTURE OF HIGH-DENSITY POWDER COMPACTS

FIELD OF THE INVENTION

The invention relates to a process for pressing electrically conductive powders or prepressed powders for producing molded parts with high pressing density, such molded parts being capable of sintering, in a pressing mold having a female die made of a material that is electrically nonconductive within the lateral wall area, and one or a plurality of top and/or bottom punches made of a conductive material, said punches being acted upon by electric current pulses during the pressing operation.

BACKGROUND OF THE INVENTION

The development of powder-metallurgical and ceramic construction components and the expansion of areas of application for construction parts so manufactured are closely connected with the capability of obtaining higher compression densities. The results are higher densities and higher mechanical strength values for the sintered parts manufactured from such powders. For this reason, in static powder compression operations, the pressing pressures currently applied reach the limits of the tool steels and other tool materials used. However, it is known that it is not possible to obtain by static compression compacts with a density that is approximately free of pores. For example, the maximally obtainable pressing density of iron and steel powders comes to approximately 90% of the theoretical density, because in the course of the pressing process, the powder particles increasingly support each other in the closed die, so that the pressing pressure required for the further compression increases asymptotically, which means the practical compression limits can be reached quickly.

Possible processes for further increasing the density of compressed powders include, for example, the hot pressing method, where high compression and sintering is obtained via the plastic flow of the powder. For example EP 0 375 469 describes such a process under the title "Process For The Electric Compression Of A Preshaped Workpiece Present In The Form Of Particles". In said process, workpieces are pre-compressed in the pressing die and subsequently compressed further and sintered by feeding an electric direct current directly into the suitably insulated pressing punches.

Other processes can be classified under the term "dynamic compression". In such processes, the pressing forces are applied in spots or lines, such forces increasing in time. Mainly with compacts of a more complex shape, such processes cause inhomogeneities in the material, and cracking to a nonnegligible extent.

A special group of processes for the compression of powder can be classified under the terms "ultrasound" and "explosion" processes. The ultrasound processes permit a denser packing position of individual powder grains only during the initial stage of the powder compression. It is not possible in practical application to manufacture compacts that are genuinely dense. A combination of compression by means of sound waves and sintering is described in DE-OS 31 38 223. The explosion processes are difficult to handle in practical life. According to such processes it is possible only to manufacture from powder compact shapes of construction components. More frequently, comparatively thin layers of powder are pressed onto compact molded bodies, using the explosion process. Such processes are not suitable for application in the production of mass-produced components, even though powder compacts having up to almost the theoretical density are obtained by explosion compression. Such a process is described, for example in DE-OS 27 38 674.

As part of the further development of the aforementioned hot-pressing process, electrically conductive powder materials are currently first prepressed statically, and subsequently compressed further and, at the same time, sintered in the pressing mold by means of electric current pulses. Highly varying implementations of the process are possible depending on the practically used pulse conditions. One variation represents a direct-sintering process with pulsed passage of current through the part to be produced over long periods of time. Such a process is described in DE-OS 27 55 855, whereby strong electric current pulses are inductively generated in the pressed material. In connection with the process variation that has become known under the name "plasma sintering", the pulse conditions created are such that in the prepressed powders with spacings remaining between the individual powder grains, an electric discharge plasma is produced, i.e., particles that are ionized at high temperatures. Such particles lead to a local melt-down of the powder particles, to plastic flow, and thus to dense sintering. In this process, the important secondary results are that oxide skins and surface impurities of the powder grains are broken down, which permits the sintering of powder grains that are otherwise difficult to sinter. Said process has been described in greater detail, for example in the scientific paper by M. Ishiyama under the title "Plasma Activated Sintering (PAS) System", published in the Proceedings of 1993, Powder Metallurgy World Congress in Osaka, Japan. A comparable process is described, for example in EP 0 451 969 under the title "Sintered Composite and Process for its Manufacture".

Each of said processes involves high-temperature sintering of molded components in the pressing mold, and the sintering operation is admittedly, substantially reduced as compared to conventional methods of sintering pre-pressed molded parts; however, the sintered articles to be produced have to remain for about 5 to 10 minutes in the equipment - which consists of the pressing mold and the pulse generator - at the sintering temperatures usually applied, which means that such methods are not suitable for manufacturing sintered, mass-produced components at low cost.

The process applied in EP 0 451 969 is illustrated in FIG. 3 of this patent, and described in greater detail in column 3 of the specification of this patent. A pressing die consists of a female pressing die having an electrically insulating coating on the inside. The female die forms the lateral wall of the pressing die. The powder charged in the female die is compressed under the customary conditions by the axial stroke of a bottom and a top metallic pressing punch. Said top and bottom punches are connected to the capacitor of a pulse discharging system. By closing a short-circuit switch, a high voltage is applied between the top and bottom punches, which permits an electric discharge between the punches to pass through the pressed material. Such discharge is repeated many times for compressing and simultaneously sintering the material. The pressed material is slightly melted and sintered together by the heat generated in the course of such repeated discharging.

OBJECTS OF THE INVENTION

The objective of the present invention is to make available a process by which compacts for mass-produced components can be manufactured from electrically conductive powder materials with a high, almost theoretical compression density at high cycle frequency. The cycle times are to be comparable to those employed during customary powder pressing of molded components on static, for example hydraulic, presses. Such pressed molded components are to be subsequently processible further to sintered bodies according to the conventional methods. In particular, the process is to be applicable also to the manufacture of molded parts made of basic material with poor electric conductivity, or also from material composites with nonconductive material components.

The foregoing specific objective of the invention is illustrative of those which can be achieved by the present invention and is not intended to be exhaustive or limiting of the possible advantages which can be realized. Thus, this and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The above-mentioned and other objects of the invention are solved by a process as specified in claim 1.

An advantage of the process of the invention lies in the pressing of powders to form compacts with high, nearly theoretical density, as a rule. Such densities are not in any case obtained solely by static pressing of powders. For example, with powders produced from iron materials according to conventional methods, about 90% of the theoretical density is obtained in the compact, whereas according to the process of the invention, up to > 99% of the theoretical density is achieved.

It would be appreciated by those skilled in the art that the foregoing brief description and the following detailed description are exemplary and explanatory of this invention, but are not intended to be restrictive thereof or limiting of the advantages which can be achieved by this invention.

DETAILED DESCRIPTION OF THE INVENTION

The powders to be compressed have to possess electric conductivity. Furthermore, through sufficient static pre-compressing of the powder and good contacts between the punch and the material pressed, the ohmic resistance of both the material pressed and the pressing die has to fall short of an upper limit for such resistance.

Of course, such minimum requirements with respect to the electric conductivity can be actively exploited as well. For zones of varying conductivity in the compact, for example, it is possible to obtain in a targeted way different final densities within individual sections of the powder contact.

Another advantage of the process of the invention lies in that powders that are afflicted with cracks and other geometric irregularities, and precompressed by pressing to 10 to 15% residual porosity, can be processed further by means of the process of the invention to largely homogeneous, crack-free compacts of the highest density.

For achieving said result, it is important that the compression can be accomplished based on only one or just on only a few current pulses, so that said process is excellently suitable for the manufacture of mass-produced components, whereby cycle times can be achieved in the pressing operation that are comparable with the high cycle times for the conventional static compression of powders in pressing molds.

Said results came as a surprise in that the so-called plasma sintering process is already being employed on basically comparable equipment. In said process, compression of the powder pressed to compacts is simultaneously accomplished by means of a great number of electric discharges via the sintering process. As opposed to the process of the present invention, high sintering temperatures are required in said plasma process, as well as long dwelling or sintering times—as compared to the process of the invention—for the material being compressed in the pressing die.

As opposed to the plasma process, metallographic tests carried out on molded parts densely compressed according to the invention did not show any notable sintering of the powder grains in the compressed material. Furthermore, according to the process of the invention, no noteworthy heating of the compressed material occurs in the compacting process, which is initiated by current pulses and achieved on account of sufficiently high conductivity of the pressed material.

It is known that the electric conductivity of compressed powder is dependent upon not only the degree of electric conductivity of the material itself, and not only upon the degree of compacting, but also on the oxide layers adhering to the surface of the powder, and/or on other solid and gaseous impurities. For that reason, it has been found that it is sometimes advantageous to carry out the compression by means of two or three successive electric pulse discharges. In such process, a first current pulse of comparatively low peak current amperage and long pulse duration is advantageously applied to the compressed material, followed by a second and, if need be, a third current pulse with comparatively high peak current amperage and short pulse duration.

The process of the invention has been successfully used for a great variety of differently shaped compacts. It has been possible to compress compacts having a comparatively large pressing area and low height (of the compact), as well as compacts with a small pressing cross-section and a large compact height. Of course, the conditions for the current pulses to be applied have to be adapted—within the ranges specified for the electric voltage, the peak current amperage, the power of the charge and the pulse duration—to the conditions of the pressing mold and the compressed material.

The process can be applied to highly different metal alloys and other electrically conductive materials. Both magnetic and nonmagnetic materials can be processed. In addition to different types of iron and steel materials it has been possible also to compress, for example copper, bronze and chromium.

Graphite has been found to be a particularly good additional material increasing the electric conductivity, as also, for example copper and aluminum.

With respect to the execution of the process of the invention, the powder to be processed does not have to satisfy any special requirements beyond the usual measure with respect to the particle shape, the particle size, or with respect to impurities adhering to the surface.

It has been found in practical applications that highly varying pulse characteristics and residual porosities have been obtained for the compressed material depending on the material used for the pressing punches. Both a number of steel grades and also hard metal, and finally also special metallic materials based on molybdenum have been successfully used as the punch material. Both ferromagnetic and other materials have been used as punch material, whereby in the case of ferromagnetic materials, a high ohmic overall resistance of the filled pressing die is expected to affect the process of the invention adversely.

Preferably, the female die is made of electrically nonconductive, nonmagnetic material. However, the use of electrically conductive female dies is conceivable provided such dies have an electrically nonconductive surface coating on the inside wall abutting the pressing punch and the pressed material.

Static presses with a mechanical or hydraulic drive have been used with equally good results as the basic equipment for the application of the process of the invention, of the type as conventionally used in the series production for the manufacture of molded parts in pressing molds.

It is very important that a spring element—e.g. a mechanical spring element—is mounted between the pressing die and the remaining press drive. For this purpose, it has been found that good results are obtained particularly when a plastic block is mounted directly on the press punch. During the static pressing operation, the plastic block is compressed and thus pretensioned, and, as the powder particles change with respect to their position and shape in the pressed material accordingly, permits during the electric current pulse a low-delay follow-up guidance of the press punch in the direction of the stroke, and with it a sudden restoration of the original static pressing pressure applied to the compressed material during the compacting process.

High-output pulse generators have been successfully used as devices for generating the heavy-current pulses.

Further developments of the process of the invention are disclosed in the dependent claims, as are particularly advantageous devices for carrying out the process of the invention.

The molded parts of high compression density manufactured according to the process of the invention can be subsequently processed further in separate sintering installations of the conventional type to sintered molded components of high strength and density.

The process of the invention is hereinafter described in greater detail on the basis of the following examples.

EXAMPLE 1

The starting material is iron powder (grain size<150 μm) available under the trade designation WP 200; supplier: the firm MANNESMANN AG. A conventional hydraulic press serves as the pressing equipment. The electric current pulses are generated by a high-output generator. The press punches are manufactured from molybdenum alloys. A high-strength ceramic material serves as the female die material. The cylindrical powder compact has a diameter of 10 mm and, following compression, a height of about 10 mm as well. The iron powder is first pre-compressed at a punch pressure of 5.0 t/cm$^2$. Subsequently, a single current pulse of 2.25 ms pulse duration, 86 kA peak current amperage, and thus of about 194 As is applied to the pressed material and the press punch. The electric voltage applied to the press punch as the current pulse is being applied comes to about 10 volts. The compression density finally obtained in the molded component amounts to 99.2% of the theoretical density.

A microscopic examination of the specimen so produced did not reveal any notable inhomogeneities either on the surface or in the interior, and especially not any cracks. The microscopic tests, moreover, did not show any signs of any noteworthy sintering of individual compacted powder particles.

The strength of molded parts compressed in this way is low and, in the first approximation, corresponds with the one of compacts manufactured according to conventional methods.

The compacts so produced are subsequently finished according to the usual methods and under the usual conditions in a continuous sintering furnace to obtain high-strength, dimensionally stable sintered parts with minimal residual porosity.

EXAMPLE 2

As in example 1, the commercially available iron powder WP 200 is compressed. The press, the press dies and the other devices for generating the electric pulses are the same ones as those used in example 1.

The powder is statically prepressed up to a final pressure of 4.3 t/cm$^2$. Subsequently, a first current pulse having the following parameters is applied to the pressing mold:

Voltage between the press punches:12 volts

Peak current amperage:67 kA

Electric charge:147 As

Discharge time:abt. $2.2 \times 10^{-3}$ s.

Various observations and measurements on the compacts so produced, for example of its ohmic resistance, are signs of unsatisfactory compression of the pressed material.

For that reason, a second electric current pulse is applied at the same compression pressure under the following conditions:

Peak current amperage:100 kA

Electric charge:500 As

Pulse duration:$5 \times 10^{-3}$ s.

The compact so produced has approximately 100% of the theoretical density. It shows no, or only insignificant sintering between individual powder particles, and it is, therefore, sintered to the finished molded component in "near-net-shape" under the usual sintering conditions.

EXAMPLE 3

The starting material used and the devices are the same as in example 1. However, 2% by weight Cu-powder with a grain size of<53 μm is admixed to the iron powder.

Deviating from the procedure in the preceding examples, a compact of about 90% theoretical density is produced first under the usual conditions without application of the electric current pulses, and presintered on conventional sintering equipment to such an extent that sintering bridges become noticeable between individual powder particles. Due to the intentionally selected geometric shape and pressing conditions, the presintered part shows some isolated notches and hairline cracks in the material. Subsequently, individual notches of varying depth were additionally produced on the presintered compact or shaped part. The molded part so pre-treated was then placed in the pressing die or pressing device again, subjected to a static pressure of 5.0 t/cm$^2$, and subsequently subjected in accordance with the invention to an electric current pulse as follows:

Voltage applied to the press dies:12 volts

Peak current amperage:130 kA

Electric charge:307 As

Pulse duration about $2.2 \times 10^{-3}$ s.

The molded part so treated subsequently showed 99% of the theoretical density. The internal hairline cracks and external notches were completely eliminated and no longer detectable under the microscope. The compact was subsequently processed further to a high-strength sintered molded part under the usual conditions.

EXAMPLE 4

Commercially available carbonyl iron (CS) of the firm BASF AG was processed. The average grain size came to 4 to 5 μm. The devices according to example 1 were used for carrying out the process.

The powder was compressed at a pressure of 4.3 t/cm² to approximately 75% of the theoretical density and subsequently subjected to two electric current pulses, which were interrupted for the purpose of testing a sample. The voltage applied to the pressing mold came in both cases to about 12 volts. The following parameters applied to the first current pulse:

Peak current amperage:7 kA

Electric charge:13 As

Pulse duration:$2 \times 10^{-3}$ s.

Thereafter, the compact showed a hardly enhanced density of 76 % of the theoretical density.

With the same pressure as admitted above, the following parameters were applied in connection with the second current pulse:

Peak current amperage:70 kA

Electric charge:490 As

Change pulse duration:7 ms.

The compressed molded part showed practically 100% of the theoretical density; it can be processed further to a high-strength sintered molded part on the conventional equipment under the usual sintering conditions.

The above examples only represent a representative selection of possible implementations of the process of the invention, and particularly of possible embodiments of the processible material. It should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

What is claimed is:

1. A process for pressing electrically conductive powders or prepressed powders to molded components, with high compression density and capable of sintering, in a pressing mold having a female die made of electrically nonconductive material in a lateral wall zone, and one or several top and/or bottom punches made of conductive material, such die being subjected to electric current pulses during the pressing operation, comprising the following steps:
    (a) applying an axial pressing pressure to the powder-filled pressing mold, such pressing pressure being less than or equal to the pressure customarily applied for static pressing to corresponding materials;
    (b) suddenly shrinking and compressing the powder volume during the pressing operation to values of greater than 96% of the theoretical value by means of 1 to 3 current pulses of about $5 \times 10^{-5}$ to about $5 \times 10^{-2}$ s duration, as well as an electric charge of greater than 20 As based on 1 cm³, and an electric voltage of less than 30 volts between the top and bottom punches; and
    (c) supporting the shrinkage in volume suddenly initiated in the powder by means of devices for a low-delay follow-up of the punches in a direction of stroke.

2. A process for pressing powders to molded components according to claim 1, wherein the pressing pressure is from about 3 to about 7 t/cm².

3. A process for pressing powders to molded components according to claim 1, wherein the electric charge is from about 100 to about 400 As.

4. A process for pressing powders to molded components according to claim 1, wherein the current pulses have a peak current amperage of between about 10 and about 100 kA based on about 1 cm² pressing area.

5. A process for processing powders to molded components according to claim 1, wherein the current pulses have a duration between about $5 \times 10^{-4}$ and about $10^{-2}$ s.

6. A process for pressing powders to molded components according to claim 1, wherein the punches are made of a high strength, electrically conductive nonmagnetic or low-magnetic material.

7. A process for pressing powders to molded components according to claim 1, wherein the powders are metallic powders.

8. A process for pressing powders to molded components according to claim 1, wherein the powders are metallized powders.

9. A process for pressing powders to molded components according to claim 1, wherein the powders are a powder mixture with electrically conductive material components.

10. A process for pressing powders to molded components according to claim 9, wherein copper, aluminum and/or graphite is added to the powder mixture as the electrically conductive material components.

11. A process for pressing powders to molded components according to claim 1, further comprising applying a first current pulse with comparatively low peak current amperage and long pulse duration and a second current pulse with high peak current amperage and short pulse duration.

* * * * *